US010934654B1

(12) United States Patent
Farris et al.

(10) Patent No.: US 10,934,654 B1
(45) Date of Patent: Mar. 2, 2021

(54) RELAY MONITOR CIRCUIT AND SECONDARY RELAY CONTROL FOR AN APPLIANCE

(71) Applicant: Haier US Appliance Solutions, Inc., Wilmington, DE (US)

(72) Inventors: Brett Alan Farris, Louisville, KY (US); Maria Alejandra Contreras, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 16/664,012

(22) Filed: Oct. 25, 2019

(51) Int. Cl.
*G05B 9/02* (2006.01)
*D06F 33/00* (2020.01)

(52) U.S. Cl.
CPC ............... *D06F 33/00* (2013.01); *G05B 9/02* (2013.01)

(58) Field of Classification Search
CPC ....................................................... D06F 33/00
See application file for complete search history.

(56) References Cited

U.S. PATENT DOCUMENTS

| 6,130,413 | A * | 10/2000 | Rak ........................... F24C 7/08 |
| | | | 219/414 |
| 8,590,346 | B2 | 11/2013 | Erenay et al. |
| 9,186,035 | B2 | 11/2015 | Hussain |
| 2001/0010639 | A1* | 8/2001 | Shirato .............. G06K 19/0705 |
| | | | 363/89 |

FOREIGN PATENT DOCUMENTS

| CN | 104814706 B | 8/2017 |
| DE | 29825044 U1 | 7/2004 |

* cited by examiner

*Primary Examiner* — Yuhui R Pan
(74) *Attorney, Agent, or Firm* — Dority & Manning, P.A.

(57) ABSTRACT

Systems and methods of for controlling and appliance are provided. A control system for operating a load of an appliance can be provided. The control system includes a processor and memory device. Memory device is configured to store instructions that when executed by processor cause the processor to perform operations. Operations include determining an operational state of a first load control device, generating a first control signal based on the operational state of the first load control device, determining the operational state of a first load control device enable circuit; generating a second control signal based on the operational state of the first load control device enable circuit; generating a first load control signal based on the first control signal and second control signal; and operating a second load control device based on the first load control signal.

18 Claims, 8 Drawing Sheets

| First Load Control Device Operational Status | First Load Control Device Enable Circuit | Second Load Control Device Enable Circuit | Second Load Control Device Operational Status |
| --- | --- | --- | --- |
| ON | Disable | Disable | OFF |
| ON | Disable | Enable | OFF |
| ON | Enable | Disable | OFF |
| ON | Enable | Enable | ON |
| OFF | Disable | Disable | OFF |
| OFF | Disable | Enable | ON |
| OFF | Enable | Disable | OFF |
| OFF | Enable | Enable | ON |

FIG. 6

RELAY MONITOR CIRCUIT AND SECONDARY RELAY CONTROL FOR AN APPLIANCE

FIELD

The present disclosure relates generally to appliances and more particularly to a relay monitor circuit and secondary relay control system for controlling electrical loads within an appliance.

BACKGROUND

Consumer appliances, such as dishwashers, clothes washers and dryers, microwaves, cooking ranges, and refrigerators, include various heaters and heating elements. These devices utilize or operate heaters and heating elements in various ways depending upon the appliance in which they are included. For example, in dishwashers and clothes washing machines, the heater or heating element may be employed to heat water for washing articles in their respective tubs or washing chambers. In clothes dryers, a heater or heating element may be employed to heat the air in a drum. A heater or heating element may be energized to cook food in a cooking range and in a refrigerator a heater may be employed for a defrosting operation. For a microwave, a magnetron is the heating element that may be energized to cook food.

When a heater or heating element is activated during an operation cycle of an appliance, electrical current can flow through the heating element and produce heat. Although heaters may be useful for certain appliance operations, it is possible for a heater to fail under certain circumstances. A failure condition may occur wherein the heater remains permanently active, or otherwise generates heat for an excessive amount of time (e.g., during a runaway condition). For example, if the current continues to flow through the heating element after the selected operation cycle ends or current continues to flow through the heating element after reaching a specified operating temperature, the appliance or its contents may be damaged, and the heating element must be replaced or serviced before any additional appliance operations resume. In some instances, if the current continues to flow through the heating element after the selected operation cycle ends or current continues to flow through the heating element after reaching a specified operating temperature, the appliance or heater can experience thermal runaway.

Thermal runaway can occur in situations where an increase in temperature changes the operating conditions of a device in a way that causes a further increase in temperature, often leading to a destructive result including damage to the appliance or the areas surrounding the appliance. For instance, an electro-mechanical relay on a dishwasher control board may become stuck in an activated or on position. Voltage may thus be supplied to a heater indefinitely. If this occurs, temperatures within the dishwashing appliance may reach damaging levels (e.g., above 110° Celsius). If articles remain within the dishwasher tub during this time, it is possible for those articles to be damaged along with portions of the dishwashing appliance. In some instances, the failure condition may be unresolvable by a consumer. A user may be required to thus unplug or completely disengage the dishwashing appliance until a trained technician is able to service the dishwashing appliance Appliances can employ various systems and methods for controlling or operating the heaters and heating elements. For example, some appliances utilize a thermal cut out (TCO) device. A TCO is an electrical safety device that interrupts electric current when heated to a specific temperature. In a dishwasher a TCO is often utilized to monitor the actual tub temperature for excessive heat. If the temperature of the TCO exceeds a threshold (e.g., gets too hot) the heating element electrical circuit is opened, and the heater or heating element ceases to operate.

However, disadvantages exist with the existing arrangement of using a TCO. For instance, a TCO generally must be reset or replaced by a trained technician. TCOs that reset automatically may not be used in appliances due to manufacturing cost or complexity. Additionally, TCOs are not always effective because of a lack of precise temperature monitoring capabilities and/or accuracy. The potential lack of effectiveness of a TCO can create a safety hazard or result in damage to or failure of the appliance.

Accordingly, a control system and method with features for monitoring and controlling the operation of heaters and heating elements in an appliance to avoid thermal runaway without the use of a TCO, which can be automatically reset and is cost effective would be useful and welcomed.

BRIEF DESCRIPTION

Aspects and advantages of embodiments of the present disclosure will be set forth in part in the following description, or may be learned from the description, or may be learned through practice of the embodiments.

One example aspect of the present disclosure is directed to a control system for operating a load of an appliance. The control system can include one or more processors and one or more memory devices. The one or more memory devices can be configured to store instructions that when executed by the one or more processors cause the one or more processors to perform certain operations. The operations can include determining an operational state of a first load control device and generating a first control signal based on the operational state of the first load control device. The operations can also include determining the operational state of a first load control device enable circuit, generating a second control signal based on the operational state of the first load control device enable circuit and generating a first load control signal based, at least in part, on the first control signal and second control signal. The control system can then operating a second load control device based, at least in part, on the first load control signal.

Another example aspect of the present disclosure is directed to a method for controlling an appliance. The appliance includes a relay monitor circuit and secondary relay control which includes a first load control device, a first load control device enable circuit, a second load control device, a second load control device enable circuit and a load. The method includes determining, by one or more controllers, the operational status of the first load control device and generating, by one or more controllers, a first control signal based on the operational state of the first load control device. The method also includes determining, by one or more controllers, the operational state of a first load control device enable circuit and generating, by one or more controllers, a second control signal based on the operational state of the first load control device enable circuit. The method can further include generating, by one or more controllers, a first load control signal based, at least in part, on the first control signal and second control signal and operating, by one or more controllers, a second load control device based, at least in part, on the first load control signal.

Another example aspect of the present disclosure is directed to an appliance including a power source, a first load control device, a second load control device, a first load control device enable circuit and one or more control devices. The one or more control devices configured to perform certain operations. The operations can include determining an operational state of a first load control device and generating a first control signal based on the operational state of the first load control device. The operations can also include determining the operational state of a first load control device enable circuit, generating a second control signal based on the operational state of the first load control device enable circuit and generating a first load control signal based, at least in part, on the first control signal and second control signal. The control system can then operating a second load control device based, at least in part, on the first load control signal.

Variations and modifications can be made to these example aspects of the present disclosure. These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 6 depicts a truth table associated with the operation of certain circuit components shown in the schematic diagram associated with the relay monitor circuit and secondary relay control system and method that is depicted in FIG. 5A, according to an example embodiment of the present disclosure.

DETAILED DESCRIPTION

Figure 1:
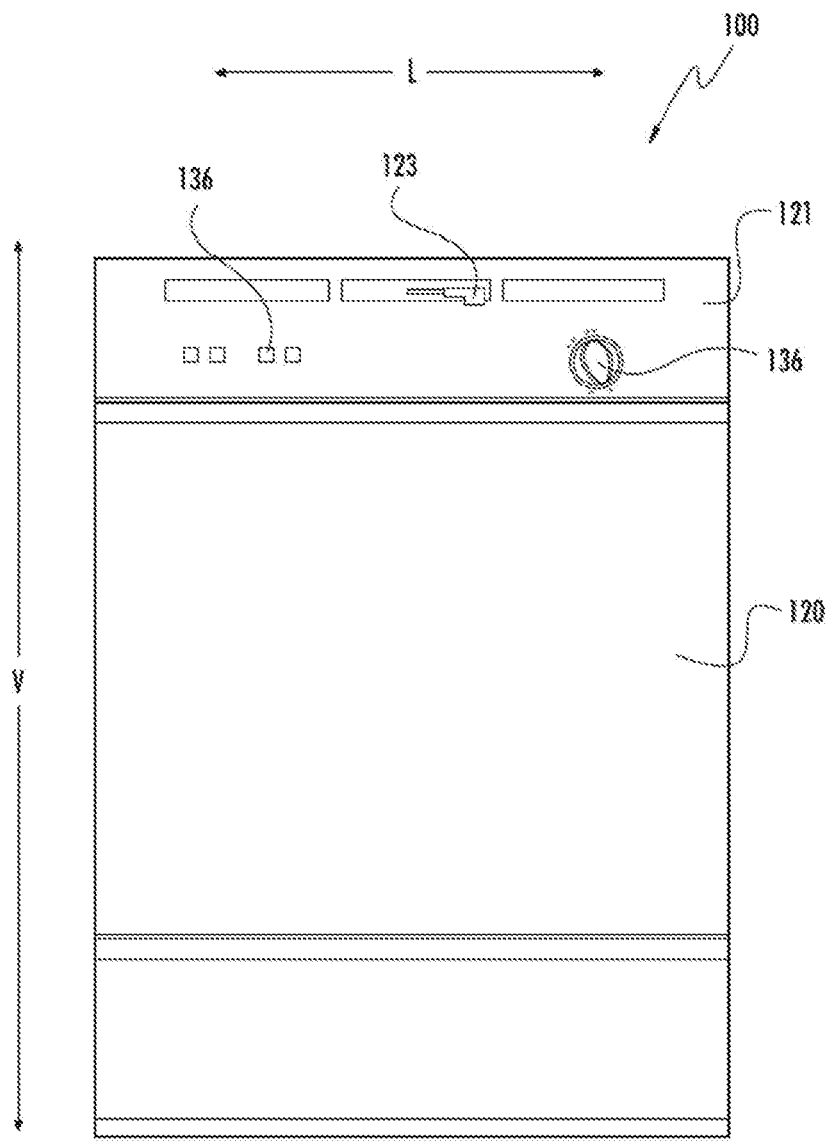
FIG. 1 depicts a front perspective view of a dishwashing appliance according to exemplary embodiments of the present disclosure.

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

One example aspect of the present disclosure is directed to a control system for operating a load of an appliance. The control system can include, one or more processors and one or more memory devices. The one or more memory devices can be configured to store instructions that when executed by the one or more processors cause the one or more processors to perform operations. The operations can include determining an operational state of a first load control device and generating a first control signal based on the operational state of the first load control device. The operations can also include determining the operational state of a first load control device enable circuit and generating a second control signal based on the operational state of the first load control device enable circuit. Additionally, the operations can include generating a first load control signal based, at least in part, on the first control signal and second control signal; operating a second load control device based, at least in part, on the first load control signal.

Another example aspect of the present disclosure is directed to an appliance. The appliance includes a power source, a first load control device, a second load control device, a first load control device enable circuit, and one or more control devices wherein the one or more control devices configured to perform operations.

The operations can include determining an operational state of a first load control device and generating a first control signal based on the operational state of the first load control device. The operations can also include determining the operational state of a first load control device enable circuit and generating a second control signal based on the operational state of the first load control device enable circuit. Additionally, the operations can include generating a first load control signal based, at least in part, on the first control signal and second control signal; operating a second load control device based, at least in part, on the first load control signal Another example aspect of the present disclosure is directed to a method for controlling an appliance. The appliance can include a relay monitor circuit and secondary relay control. The relay monitor circuit and secondary relay control can include a first load control device, a first load control device enable circuit, a second load control device, a second load control device enable circuit and a load. The control method can include determining, by one or more controllers, the operational status of the first load control device and generating, by one or more controllers, a first control signal based on the operational state of the first load control device. The control method can further include determining, by one or more controllers, the operational state of a first load control device enable circuit and generating, by one or more controllers, a second control signal based on the operational state of the first load control device enable circuit. The control method can further include generating, by one or more controllers, a first load control signal based, at least in part, on the first control signal and second control signal and operating, by one or more controllers, a second load control device based, at least in part, on the first load control signal.

Referring now to the figures, example aspects of the present disclosure will be discussed in greater detail.

FIGS. 1 through 4 depict an exemplary domestic dishwasher or dishwashing appliance 100 that may be configured in accordance with aspects of the present disclosure. Dishwashing appliance 100 includes a cabinet 102 having a tub 104 therein that defines a wash chamber 106. The tub 104 includes a front opening and a door 120 hinged at its bottom 122 for movement between a normally closed vertical position (shown in FIGS. 1 and 2), wherein the wash chamber 106 is sealed shut for washing operations, and a horizontal open position for loading and unloading of articles from the dishwasher. In some embodiments, a latch 123 is used to lock and unlock door 120 for access to wash chamber 106.

Figure 2:
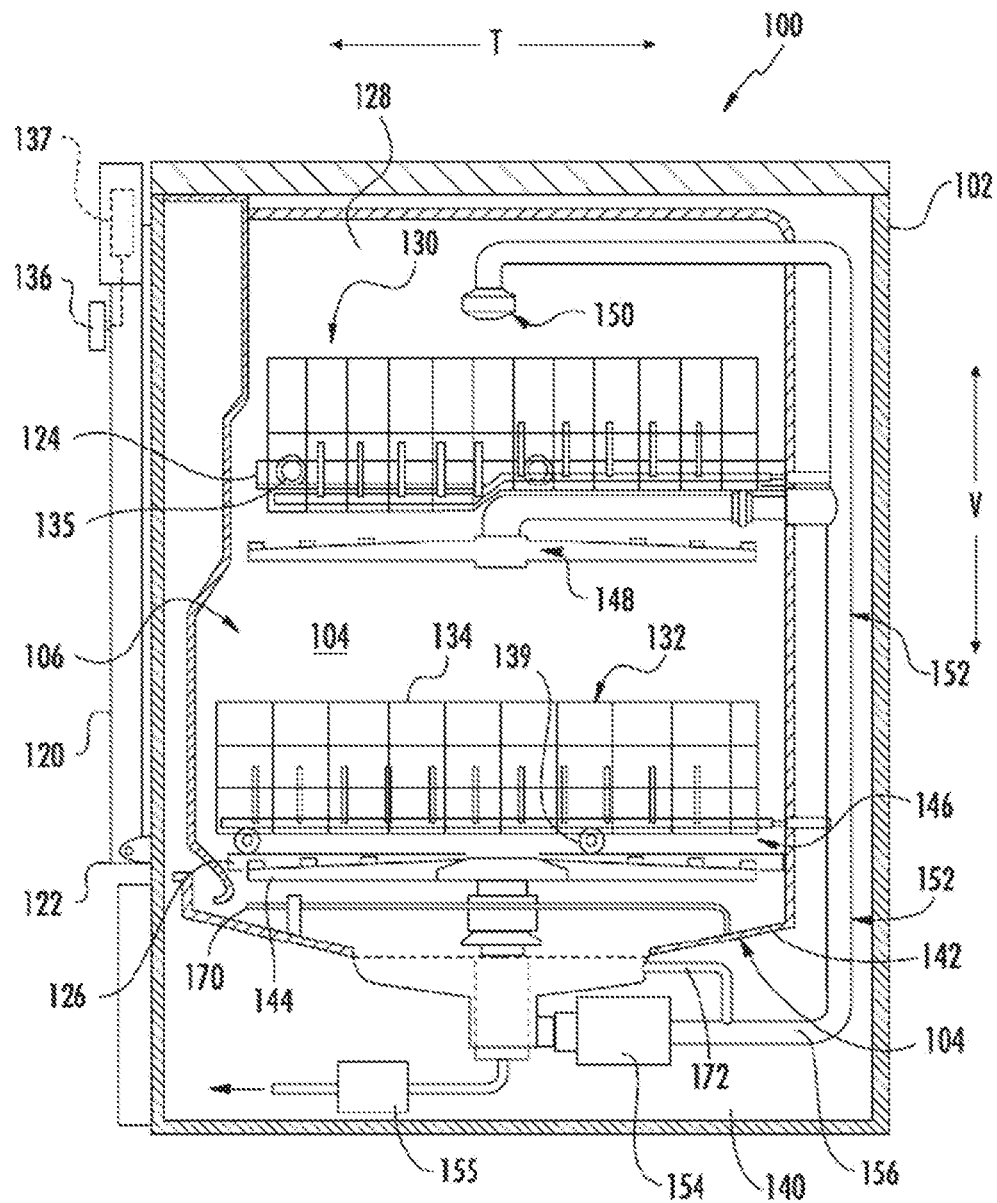
FIG. 2 depicts a side view of the exemplary dishwashing appliance of FIG. 1.
Figure 3:
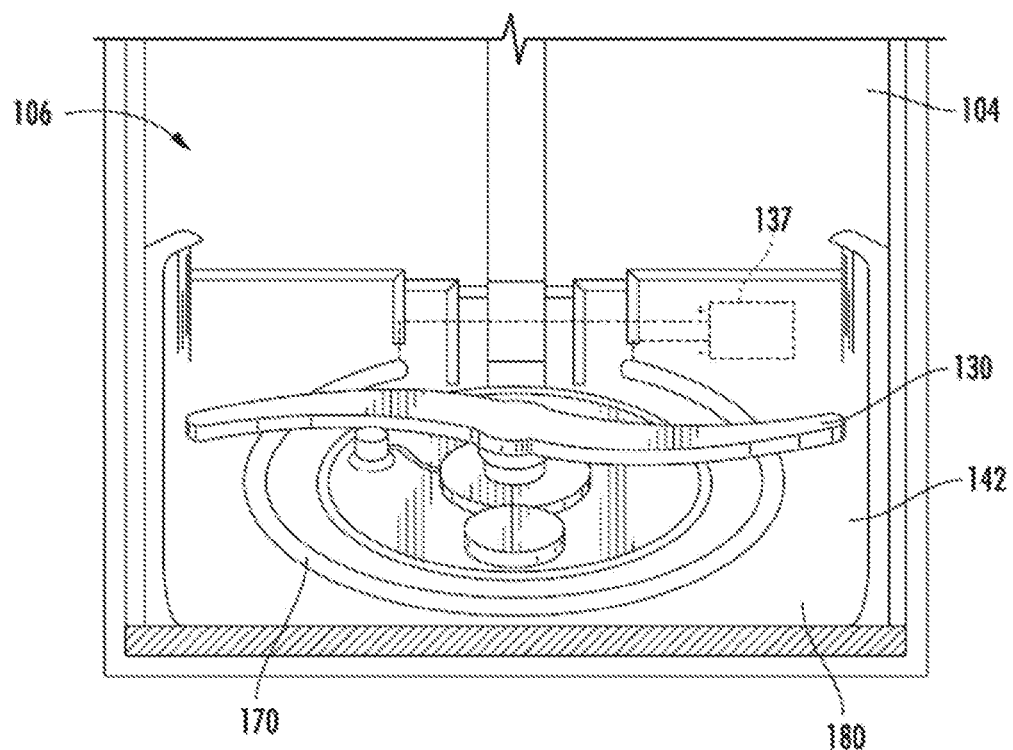
FIG. 3 depicts a front perspective view of an internal portion of the exemplary dishwashing appliance of FIG. 2.
Figure 4:
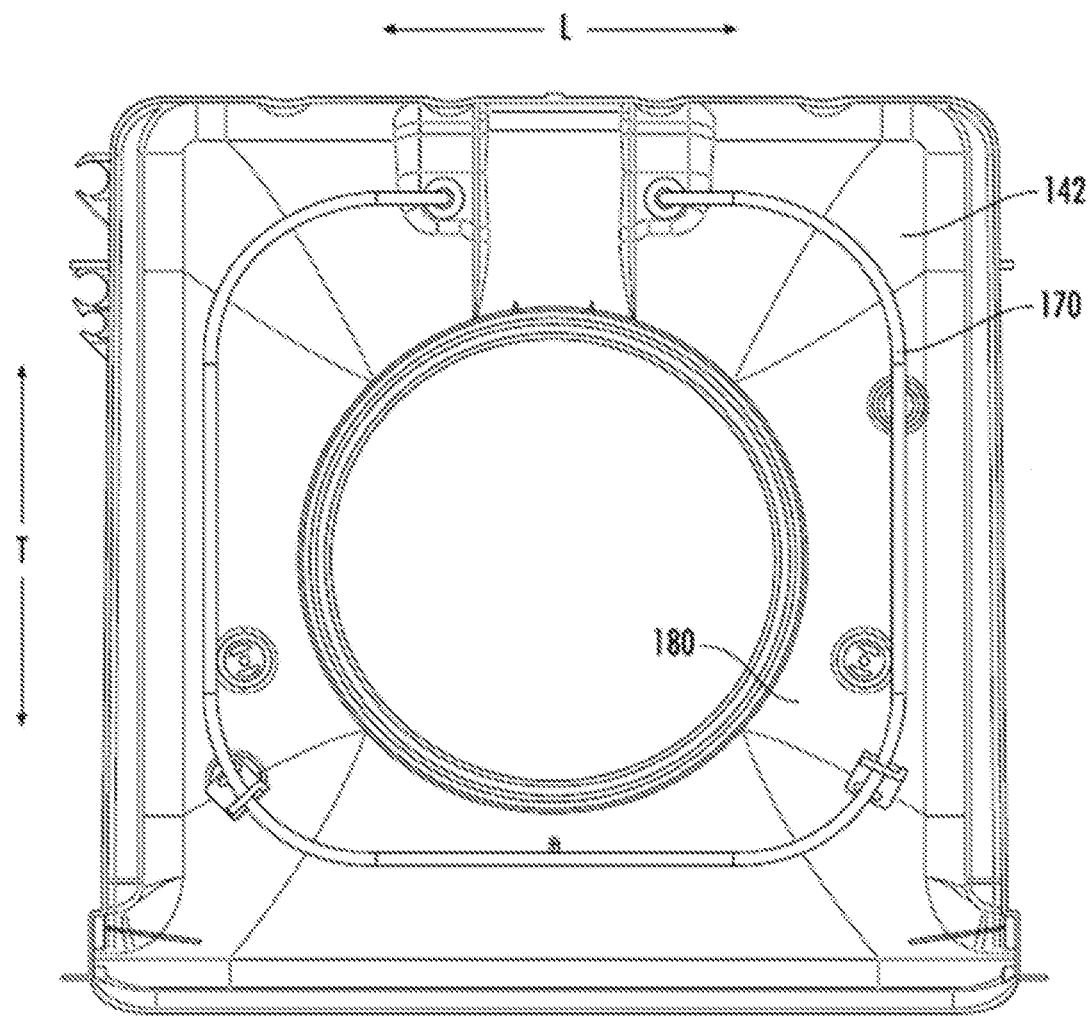
FIG. 4 depicts a top perspective view of an internal portion of the tub of the exemplary dishwashing appliance of FIG. 3.

In some embodiments, upper and lower guide rails 124, 126 are mounted on tub side walls 128 and accommodate roller-equipped rack assemblies 130 and 132. In optional embodiments, each of the rack assemblies 130, 132 is fabricated into lattice structures including a plurality of elongated members 134 (for clarity of illustration, not all elongated members forming assemblies 130 and 132 are shown in FIG. 2). Each rack 130, 132 is adapted for movement between an extended loading position (not shown), in which the rack is substantially positioned outside the wash chamber 106, and a retracted position (shown in FIGS. 1 and 2), in which the rack is located inside the wash chamber 106. This rack movement may be facilitated by rollers 135 and 139, for example, mounted onto racks 130 and 132, respectively. A silverware basket (not shown) may be removably attached to rack assembly 132 for placement of silverware, utensils, and the like that are otherwise too small to be accommodated by the racks 130, 132.

In certain embodiments, dishwashing appliance 100 includes a lower spray-arm assembly 144 that is rotatably mounted within a lower region 146 of the wash chamber 106 and above a tub sump portion 142 so as to rotate in relatively close proximity to rack assembly 132. In exemplary embodiments, such as the embodiment of FIGS. 1 and 2, one or more elevated spray assemblies 148, 150 are provided above the lower spray-arm assembly 144. For instance, a mid-level spray-arm assembly 148 is located in an upper region of the wash chamber 106 and may be located in close proximity to upper rack 130. Additionally or alternatively, an upper spray assembly 150 may be located above the upper rack 130.

The lower and mid-level spray-arm assemblies 144, 148 and the upper spray assembly 150 are part of a fluid circulation assembly 152 for circulating a wash fluid, such as water or dishwasher fluid, in the tub 104. In turn, fluid circulation assembly 152 may provide a flow of wash fluid within the wash chamber 106. For instance, fluid circulation assembly 152 includes a water inlet hose 172 in fluid communication with the wash chamber 106 (e.g., through bottom wall or sidewall of tub 104) to supply water thereto, as generally recognized in the art. The sump portion 142 may thus be filled with water through a fill port that outlets into wash chamber 106. A water supply valve may be provided to control water to the wash chamber 106. Water supply valve may have a hot water inlet that receives hot water from an external source, such as a hot water heater and a cold water input that receives cold water from an external source. It should be understood that the term "water supply" is used herein to encompass any manner or combination of valves, lines or tubing, housing, and the like, and may simply comprise a conventional hot or cold water connection.

In some embodiments, fluid circulation assembly 152 includes a recirculation pump 154 positioned in a machinery compartment 140 located below the tub sump portion 142 (e.g., below a bottom wall) of the tub 104, as generally recognized in the art. The recirculation pump 154 receives fluid from sump 142 to provide a flow to assembly 152 (e.g., via recirculation conduit 156), or a switching valve or diverter (not shown) may optionally be used to select flow. Additionally or alternatively, a separate drain pump 155 may be provided to selectively drain water or wash fluid from sump 142. For instance, drain pump 155, including an exit conduit, may be positioned downstream from sump 142 in fluid communication with wash chamber 104. The exit conduit may extend to a drain outlet. When drain pump 155 is activated, fluid and/or particles within wash chamber 104 may be directed through the exit conduit, flowing wash fluid to an area outside of appliance 100, e.g., an ambient area.

Each spray-arm assembly 144, 148 includes an arrangement of discharge ports or orifices for directing washing fluid received from the recirculation pump 154 onto dishes or other articles located in rack assemblies 130 and 132. The arrangement of the discharge ports in spray-arm assemblies 144, 148 provides a rotational force by virtue of washing fluid flowing through the discharge ports. The resultant rotation of the spray-arm assemblies 144, 148 and the operation of the spray assembly 150 using fluid from the recirculation pump 154 provides coverage of dishes and other dishwasher contents with a washing spray. Other configurations of spray assemblies may be used as well.

In some embodiments, the dishwashing appliance 100 is further equipped with a controller 137 to regulate operation of the dishwashing appliance 100. The controller 137 may include one or more memory devices and one or more microprocessors, such as general or special purpose microprocessors operable to execute programming instructions or micro-control code associated with a cleaning cycle. The memory may represent random access memory such as DRAM or read only memory such as ROM or FLASH. In one embodiment, the processor executes programming instructions stored in memory. For certain embodiments, the instructions include a software package configured to operate appliance 100 and, for example, execute the commands associated with the control method for a relay monitor circuit and secondary relay control for an appliance referenced in FIGS. 5 and 6. For certain embodiments, a relay monitor circuit and secondary relay control, such as circuit 700 described below with reference to FIG. 7, can be integrated with or included with controller 137 and/or be situated in a configuration that is separate from controller 137, such that the relay monitor circuit and secondary relay control is a separate replaceable unit. Data can be communicated to or from controller 137 from circuit 700 in order to control operation of dishwashing appliance 100, including heating element 170. The memory may be a separate component from the processor or may be included onboard within the processor. Alternatively, controller 137 may be constructed without using a microprocessor (e.g., using a combination of discrete analog or digital logic circuitry, such as switches, amplifiers, integrators, comparators, flip-flops, AND gates, and the like) to perform control functionality instead of relying upon software.

The controller 137 may be positioned in a variety of locations throughout dishwashing appliance 100. In the illustrated embodiment, the controller 137 may be located within a control panel area 121 of door 120, as shown in FIGS. 1 and 2. In some such embodiments, input/output ("I/O") signals may be routed between the controller 137 and various operational components (e.g., pumps 154, 155)

of dishwashing appliance 100 along one or more wiring harnesses that may be routed through the dishwashing appliance 100.

Optionally, the controller 137 includes a user interface 136 through which a user may select various operational features and modes and monitor progress of the dishwashing appliance 100. In exemplary embodiments, the user interface 136 may represent a general purpose I/O ("GPIO") device or functional block. For instance, the user interface 136 may include input components, such as one or more of a variety of electrical, mechanical, or electro-mechanical input devices including rotary dials, push buttons, and touch pads. The user interface 136 may include a display component, such as a digital or analog display device designed to provide visual operational feedback to a user. Additionally or alternatively, the user interface 136 may include one or more audio feedback devices (e.g., speakers) designed to provide audio operational feedback to a user. The user interface 136 may be in communication with the controller 137 via one or more signal lines or shared communication buses. In some embodiments, the user interface 136 is configured to receive one or more alert signals from the controller 137 and, in turn, generate a visual or audio alert response (e.g., at the display device or audio device of the user interface 136).

In additional or alternative embodiments, controller 137 is configured to operably communicate (e.g., wirelessly communicate) with one or more user devices (not pictured), such as a general purpose computer, special purpose computer, laptop, desktop, integrated circuit, mobile device, smartphone, tablet, or other suitable computing device. For instance, controller 137 may be in wireless communication with a user device via a suitable wireless network; such as a local area network (e.g., intranet), wide area network (e.g., internet), low power wireless networks [e.g., Bluetooth Low Energy (BLE)], or some combination thereof and can include any number of wired or wireless links. In general, communication over the network can be carried via any type of wired or wireless connection, using a wide variety of communication protocols (e.g., TCP/IP, HTTP, SMTP, FTP), encodings or formats (e.g., HTML, XML), or protection schemes (e.g., VPN, secure HTTP, SSL).

In some embodiments, a heating element 170 is operably coupled (e.g., electrically coupled or wirelessly coupled) to the controller 137 and the relay monitor circuit and secondary relay control, such as circuit 700, to selectively provide heat to the wash chamber 106 (e.g., during a drying cycle). For example, heating element 170 may be provided as a resistive heating element 170 mounted to a bottom portion of tub 104. In some such embodiments, heating element 170 is attached to a bottom wall 180 within the sump 142 or wash chamber 106. During use, the controller 137 and relay monitor circuit and secondary relay control, such as circuit 700, may thus transmit one or more heating signals (e.g., as an electrical current) in order to activate heating element 170 and initiate the generation of heat therefrom.

It should be appreciated that the present disclosure is not limited to any particular style, model, or configuration of dishwasher. The exemplary embodiment depicted in the figures is for illustrative purposes only. For example, different locations may be provided for user interface 136, different configurations may be provided for racks 130, 132, different structures or location may be provided for heater 170, different configurations may be provided for fluid assembly 152, and other differences may be applied as well.

Controller 137 which may generally include one or more processor(s) and associated memory configured to perform a variety of computer-implemented functions (e.g., performing the methods, steps, calculations and the like disclosed herein). By way of example, any/all of the "control devices" or "controllers" discussed in this disclosure can include a memory and one or more processing devices such as microprocessors, CPUs or the like, such as general or special purpose microprocessors operable to execute programming instructions or micro-control code associated with operation of an induction cooktop appliance 10. The memory can represent random access memory such as DRAM, or read only memory such as ROM or FLASH. In one embodiment, the processor executes programming instructions stored in memory. The memory can be a separate component from the processor or can be included onboard within the processor. As used herein, the term "processor" refers not only to integrated circuits referred to in the art as being included in a computer, but also refers to a controller, microcontroller, a microcomputer, a programmable logic controller (PLC), an application specific integrated circuit (ASIC), and other programmable circuits. Additionally, the memory may generally include memory element(s) including, but not limited to, a computer readable medium (e.g., random access memory (RAM)), computer readable non-volatile medium (e.g., flash memory) and/or other suitable memory elements.

Figure 5A:
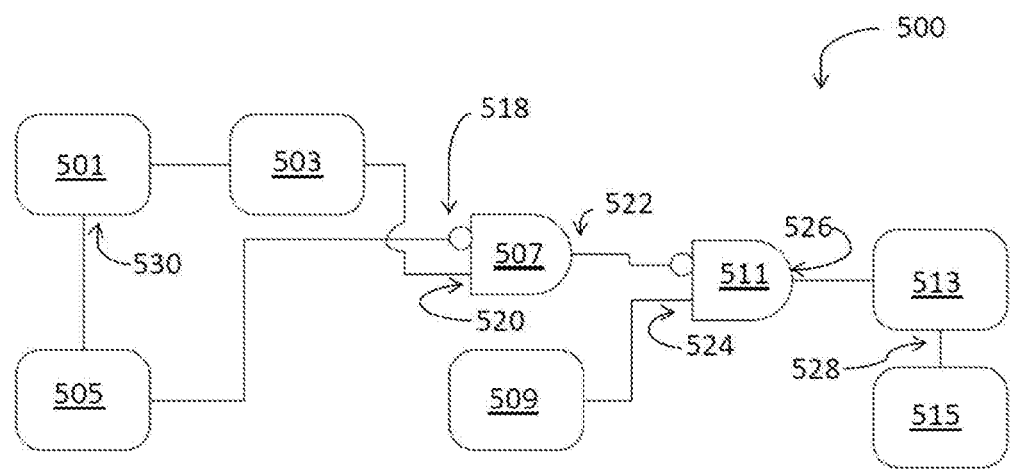
FIG. 5A depicts a schematic diagram of a relay monitor circuit and secondary relay control system according to example embodiments of the present disclosure.

FIG. 5A depicts a schematic diagram of a relay monitor circuit and secondary relay control system 500 according to example embodiments of the present disclosure.

Relay monitor circuit and secondary relay control system 500 may be used to control certain operations of a load 515, such as heating element 170 of dishwasher 100. Relay monitor circuit and secondary relay control system 500 can be incorporated with one or more controllers, such as controller 137, or with other electronic components, PCBs or circuit elements included with an appliance, such as dishwasher 100. Alternatively, relay monitor circuit and secondary relay control system 500 may be configured as a separate and modular unit that can be removably attached to dishwasher 100 and/or in electrical communication with controller 137, such that relay monitor circuit and secondary relay control system 500 may be disconnected and/or removed from dishwasher 100 and replaced by an end user or consumer. Relay monitor circuit and secondary relay control system 500 can be utilized to control the delivery of power to any electrical load in appliance 100, such as heating element 170 (depicted in FIG. 4).

Relay monitor circuit and secondary relay control system 500 includes a first load control device 501 and a second load control device 513 which are selectively operated to control the delivery of electrical power to load 515. Controller 137 may be utilized to perform some or all of the operations of relay monitor circuit and secondary relay control system 500, such that electrical power selectively delivered to load 515. Relay monitor circuit and secondary relay control system 500 is directed at avoiding second load control device 513 being enabled or in an "ON" state (e.g., configured such that the second load control device 513 electrically couples an electrical power supply to a load) when: (a) the first load control device 501 status is active (e.g., the first load control device, such as a switching element, is configured such that it electrically couples a electrical power supply to a load; or the switching element is associated with the first load control device is closed); and (b) the first load control device enable circuit is disabled (e.g., in an "OFF" state). In this way, relay monitor circuit and secondary relay control 500 implements a secondary load control device, such as second load control device 513 that is disabled if it is determined that a first load control device, such as load control device 501, has failed or is otherwise operating improperly or not in accordance with a user input or command or control signal from controller, such as controller 137. In this way, relay monitor circuit and secondary relay control system 500 can be utilized to prevent a single point failure within the power system of an appliance, which can result in continued operation of a load in an appliance, such as load 515, when operation should have ceased based on a user generated or controller generated command for appliance or a component of the appliance. Such single point failure can result in undesirable conditions, such as thermal runaway of heating element 170.

Relay monitor circuit and secondary relay control system 500 includes a first load control device 501 and a second load control device 513. First load control device 501 and second load control device 513 can each be a relay, triac or other suitable switching element. First load control device 501 and second load control device 513 can be any controllable electrical switching element capable of selectively coupling a power supply to a load or otherwise facilitate or interrupt the flow of electrical power to a load of an appliance from a power source.

Relay monitor circuit and secondary relay control system 500 includes a first load control device status detector 503. First load control device status detector 503 can be a sensor (such as and AC or DC current measurement device, or the AC voltage monitor 703 depicted in FIG. 7) or other circuit elements configured to determine when first load control device 501 is in an "ON" state (e.g., first load control device is configured such that it has coupled an electrical power supply to a load; a switching element comprising first load control device 501 is closed) or in an "OFF" state (e.g., first load control device is configured such that an electrical power supply is electrically disconnected from a load; the switching element comprising first load control device 501 is open). First load control device status detector 503 can be utilized to process a coil voltage waveform can be used to determine if an AC load is switched/present. First load control device status detector 503 could also be a DC voltage monitor on a coil of a solenoid. First load control device status detector 503 can generate a signal, such as a voltage, current or another electrical signal, indicative whether first load control device 501 is in an ON state or an OFF state. When first load control device status detector 503 determines first load control device 501 is in an ON state, first load control device status detector 503 generates a signal 520 indicative thereof. Signal 520 can be a binary logic output such as a 1, High or True. When first load control device status detector 503 determines first load control device 501 is in an OFF state, first load control device status detector 503 generates a signal 520 indicative thereof. Signal 520 can be a binary logic output such as a 0 (zero), Low or False.

Relay monitor circuit and secondary relay control 500 includes a first load control device enable circuit 505. First load control device enable circuit 505 can be a solenoid coil. First load control device enable circuit 505 can generate, in response to one or more controllers, a control command or signal 530, to first load control device 501 indicative of the intended or desired operational state in which first load control device 501 (e.g., an "ON" state or an "OFF" state). The control command or signal 530 could be based on a user input indicative of the intended or desired operational state, provided through user interface 136 through which a user may select various operational features and modes, or another command received from controller 137 (e.g., a command related to a particular point of an operational cycle such as a wash cycle).

First load control device enable circuit 505 can also generate a signal 520 indicative of the control command or signal 530 provided to first load control device 501. When control command or signal 530 is indicative of first load control device 501 operating in an ON state, first load control device enable circuit 505 generates a signal 518 indicative thereof. Signal 518 can be a binary logic output such as a 1, High or True. When control command or signal 530 is indicative of first load control device 501 operating in an OFF state, first load control device enable circuit 505 generates a signal 518 indicative thereof. Signal 518 can be a binary logic output such as a 0 (zero), Low or False.

Relay monitor circuit and secondary relay control 500 can generate a first load control signal 522 based on signal 518 and signal 520. Wherein first load control signal 522 will be as shown in Table 1 below based upon the indicated inputs for signal 518 and signal 520 as processed by logic gate 507.

TABLE 1

| Signal 518 | Signal 520 | First Load Control Signal 522 |
|---|---|---|
| 0 | 0 | 0 |
| 0 | 1 | 1 |
| 1 | 0 | 0 |
| 1 | 1 | 0 |

Relay monitor circuit and secondary relay control 500 can include a second load control device enable circuit 509 generating a signal 524 indicative of a second control command or signal for a desired or intended operating condition. Second control device enable circuit 509 can be a solenoid coil. Second load control device enable circuit 509 can generate, in response to one or more controllers, a second control command or signal 524 indicative of the desired or intended operational state in which second load control device 513 (e.g., where a user input or command from controller 137 is indicative of second load control device 513 operating in an "ON" state or an "OFF" state). The second control command or signal 524 could be based on a user input, provided through user interface 136 through which a user may select various operational features and modes, or other command received from controller 137.

Relay monitor circuit and secondary relay control 500 can generate a second load control signal 526 based on first load control signal 522 and second command or signal 524. Wherein second load control signal 526 will be as shown in Table 2 below based upon the indicated inputs for first load control signal 522 and second command or signal 524 as processed by logic gate 511.

TABLE 2

| First Load Control Signal 522 | Second Command or Signal 524 | Second Load Control Signal 526 |
|---|---|---|
| 0 | 0 | 0 |
| 0 | 1 | 1 |
| 1 | 0 | 0 |
| 1 | 1 | 0 |

Second load control signal 526 is indicative of the operational state for second load control device 513.

Second control signal 526 is provided, by controller 137, to second load control device 513. When second control signal 526 is a binary logic output such as a 1, High or True, a power signal 528 is generated and provided to controller 137, such that second load control device 513 and load 515 are operating in an "ON" state (e.g., the switching element is configured such that it couples an electrical power supply to an electrical path to a load; the load control device permits the flow of power; the switching element is such that a circuit is closed). When these conditions exist, load 515 receives electrical power and is in an operational state (e.g., heating element 170 is activated and generates heat therefrom).

When second control signal 526 is a binary logic output such as a 0 (zero), Low or False, a power signal 528 is generated and provided to controller 137, such that second load control device 513 and load 515 are operating in an "OFF" state (e.g., the switching element is configured such that it decouples an electrical power supply to an electrical path to a load; the load control device prevents the flow of power; the switching element is such that a circuit is open). When these conditions exist, load 515 does not receive electrical power and is not in an operational state (e.g., heating element 170 is not activated and does not generates heat therefrom).

Figure 5B:
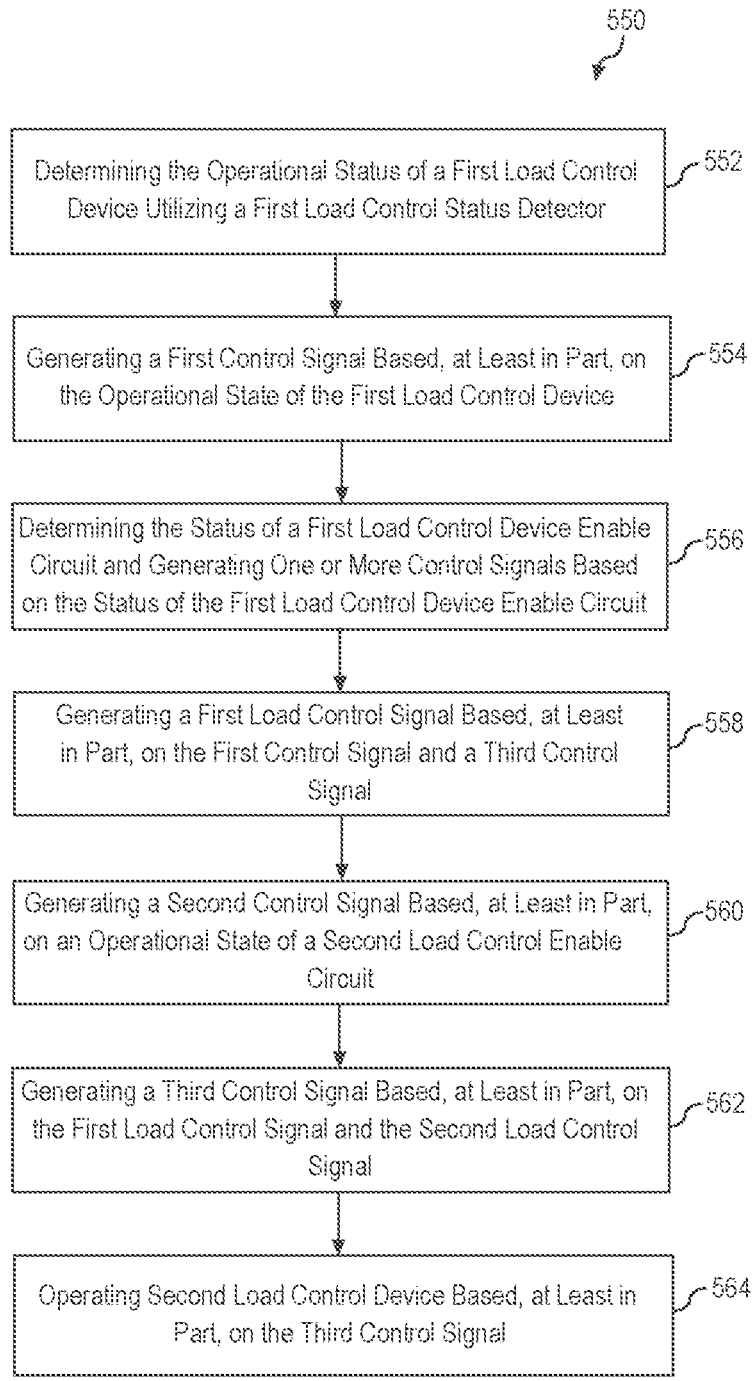
FIG. 5B depicts a flow diagram of an example method of controlling an appliance based, at least in part, on a relay monitor circuit and secondary relay control according to an example embodiment of the present disclosure.

FIG. 5B depicts a flow chart of an example method 550 for controlling an appliance, such as dishwasher 100, based at least in part on a relay monitor circuit and secondary relay control, such as circuit 500 or circuit 700, according to example embodiments of the present disclosure. Method 550 can be utilized to control the delivery of power to a load in an appliance, such as load 515, on the line and neutral side of a load.

Method 500 can include at (552) determining the operational state of a first load control device, such as first load control device 501, utilizing a first load control device status detector, such as first load control device status detector 503.

At (554) the method can include generating a first control signal, such as signal 520 based, at least in part, on the operational state of the first load control device. When at (554), first load control device status detector 503 determines first load control device 501 is in an ON state, first load control device status detector 503 generates a first control signal 520 indicative thereof. In this case, first control signal 520 can be a binary logic output such as a 1, High or True. When at (504), first load control device status detector 503 determines first load control device 501 is in an OFF state, first load control device status detector 503 generates a first load control signal 520 indicative thereof. In this case, first load control signal 520 can be a binary logic output such as a 0 (zero), Low or False.

At (556) the method can include determining the status of first load control device enable circuit 505 and generating a second control signal 530, indicative of the intended or desired operational state of first load control device 501. For example, first load control device enable circuit 505 can generate a second control signal 530, indicative of the intended or desired operational state of first load control device 501 (e.g., an "ON" state or an "OFF" state). The second control signal 530 can be based on a user input indicative of the intended or desired operational state of appliance 100. The user input can be provided through user interface 136 through which a user may select various operational features, actions, functions, or modes of the appliance (e.g., a user input to commence a washing cycle). The second control signal 530 can also be based on a control command or instruction received from controller 137 to facilitate a continued operation or facilitate the performance of a predetermined set of operations by appliance 100 (e.g., a command related to a particular point of an operational cycle, for example of a wash cycle, such as a rinse operation or drying operation). Second control signal 530 is provided to first load control device 501 and/or controller 137 and the operation of first load control device 501 is based, at least in part on the second control signal 530.

At (556) the method can include first load control device enable circuit 505 generating a third control signal 518 based on and indicative of the second control signal 530 provided to first load control device 501. When at (556), second control signal 530 is indicative of first load control device 501 operating in an ON state, first load control device enable circuit 505 generates a third control signal 518 indicative thereof. Third control signal 518 can be a binary logic output such as a 1, High or True. When at (556), second control signal 530 is indicative of first load control device 501 operating in an OFF state, first load control device enable circuit 505 generates a third control signal 518 indicative thereof. Third control signal 518 can be a binary logic output such as a 0 (zero), Low or False.

At (558) the method can include generating a first load control signal 522 based on third control signal 518 and first control signal 520. Wherein first load control signal 522 can be a binary logic output and will be as shown in Table 3 below based upon third control signal 518 and first control signal 520 as processed by logic gate 507 to generate first load control signal 522.

TABLE 3

| Third Control<br>Signal 518 | First<br>Control Signal 520 | First Load<br>Control Signal 522 |
|---|---|---|
| 0 | 0 | 0 |
| 0 | 1 | 1 |
| 1 | 0 | 0 |
| 1 | 1 | 0 |

At (560) the method can include second load control device enable circuit 509 generating a second load control signal 524 indicative of a command or signal for a desired or intended operating condition of load 515. For example, second load control device enable circuit 509 can generate a second load control signal 524, indicative of the intended or desired operational state of the appliance 100 or a component thereof, such as heating element 170. Second load control signal 524 can be based on a user input indicative of the intended or desired operational state of appliance 100. The user input can be provided through user interface 136 through which a user may select various operational features, actions, functions, or modes of the appliance (e.g., a user input to commence a washing cycle). Second load control signal 524 can also be based on a command received from controller 137 to facilitate a continued operation or a predetermined set of operations by appliance 100 (e.g., a command related to a particular point of an operational cycle such as during a wash cycle, initiating a rinse operation or drying operation).

Second load control device enable circuit 509 can generate the second load control signal 524 indicative of the desired or intended operational state for second load control device 513 (e.g., where a user input or command from controller 137 is indicative of requirement for second load control device 513 to operate in an "ON" state or an "OFF" state). The second load control signal 524 could be based on a user input, provided through user interface 136 and correspond to user selection of certain operational features or modes of appliance 100, or another command received from controller 137 to facilitate a continued operation or a predetermined set of operations by appliance 100 (e.g., a command related to a particular point of an operational cycle such as during a wash cycle, initiating a rinse operation or drying operation).

At (562) the method can include generating a third load control signal 526 based on first load control signal 522 and second load control signal 524. Wherein third load control signal 526 can be a binary logic output and will be as shown in Table 4 below based upon the indicated inputs for first load control signal 522 and second load control signal 524 as processed by logic gate 511 to generate third load control signal 526.

TABLE 4

| First Load Control Signal 522 | Second Load Control Signal 524 | Third Load Control Signal 526 |
|---|---|---|
| 0 | 0 | 0 |
| 0 | 1 | 1 |
| 1 | 0 | 0 |
| 1 | 1 | 0 |

At (564) the method includes operating the second load control device 513 based on the third load control signal 526. At (564) the third load control signal 526 is provided to second load control device 513. When at (564) third load control signal 526 is a binary logic output such as a 1, High or True, second load control device 513 operates such that power is provided to load 515 (e.g., in an "ON" state; second load control device 513 is configured such that it couples an electrical power supply to load 515; switching element of second load control device is closed). When these conditions exist at (564), appliance 100 or a portion thereof is energized or receives power, such as heating element 170 receives electrical power and generates heat therefrom.

At (564) when at third load control signal 526 is a binary logic output such as a 0 (zero), Low or False, second load control device 513 operates such that power is not provided to load 515 (e.g., in an "OFF" state; second load control device 513 is configured such that it electrically disconnects an electrical power supply to load 515; switching element of second load control device is closed). When these conditions exist at (564), appliance 100 or a portion thereof is not energized or does not receive power, such as heating element 170 does not receive electrical power and does not generate heat therefrom.

FIG. 6 depicts a truth table 600 based on the schematic diagram for relay monitor circuit and secondary relay system 500 that is depicted in FIG. 5A and the control method 550 depicted in FIG. 5B, according to an example embodiment of the present disclosure.

Column 602 of table 600 is indicative of the operational state of load control device 501 as detected at method step (550). When first load control device 501 is in an "ON" state (e.g., the switching element is configured such that it couples an electrical power supply to a load; the switching element is closed) first load control device status detector 503 generates a first control signal 520 indicative thereof. First load control signal 520 can be a binary logic output such as a 1, High or True, which corresponds to an "ON" designation in column 602.

When first load control device 501 is in an "OFF" state (e.g., the switching element is configured such that it decouples an electrical power supply to an electrical path to a load; the load control device prevents the flow of power; the switching element is such that a circuit is open) first load control device status detector 503 generates a first control signal 520 indicative thereof. First load control signal 520 can be a binary logic output such as a 0 (zero), Low or False which corresponds to a "OFF" designation in column 602.

Column 604 of table 600 is indicative of the second control signal 530 generated by first load control device enable circuit 505 at method step (556). In column 604 an "enable" designation represents a condition when at (556), second control signal 530 is indicative of a user input indicative of the intended or desired operational state of appliance 100 requiring first load control device 501 operating in an ON state, and first load control device enable circuit 505 generating a third control signal 518 indicative thereof. In this scenario, third control signal 518 can be a binary logic output such as a 1, High or True.

In column 604 a "disable" designation represents a condition when at (556), second control signal 530 is indicative of a user input indicative of the intended or desired operational state of appliance 100 requiring first load control device 501 operating in an OFF state, and first load control device enable circuit 505 generating a third control signal 518 indicative thereof. In this scenario, third control signal 518 can be a binary logic output such as a 0 (zero), Low or False.

Column 606 of table 600 is indicative of the second load control signal 524 generated by second load control device enable circuit 509 at method step (560). In column 606 an "enable" designation represents a condition when at (560), second load control signal 524 is indicative of a user input indicative of the intended or desired operational state of appliance 100 requiring second load control device 513 operating in an ON state, and second load control device enable circuit 509 generating a second load control signal 524 indicative thereof. In this scenario, signal 524 can be a binary logic output such as a 1, High or True which corresponds to an "enable" designation in column 606.

In column 606 a "disable" designation represents a condition when at (560), second load control signal 524 is indicative of a user input indicative of the intended or desired operational state of appliance 100 requiring second load control device 513 operating in an OFF state, and second load control device enable circuit 509 generating a second load control signal 524 indicative thereof. Second load control signal 524 can be a binary logic output such as a 0 (zero), Low or False which corresponds to an "disable" designation in column 606.

Column 608 of table 600 is indicative of the operational state of second load control device 513 at method step (564). When second load control device 513 is in an "ON" state (e.g., the switching element is configured such that it couples an electrical power supply to a load; the switching element is closed). When second load control device 513 is in an "OFF" state (e.g., the switching element is configured such that it decouples, disconnects or interrupts an electrical power supply to a load; the switching element is open).

Figure 7:
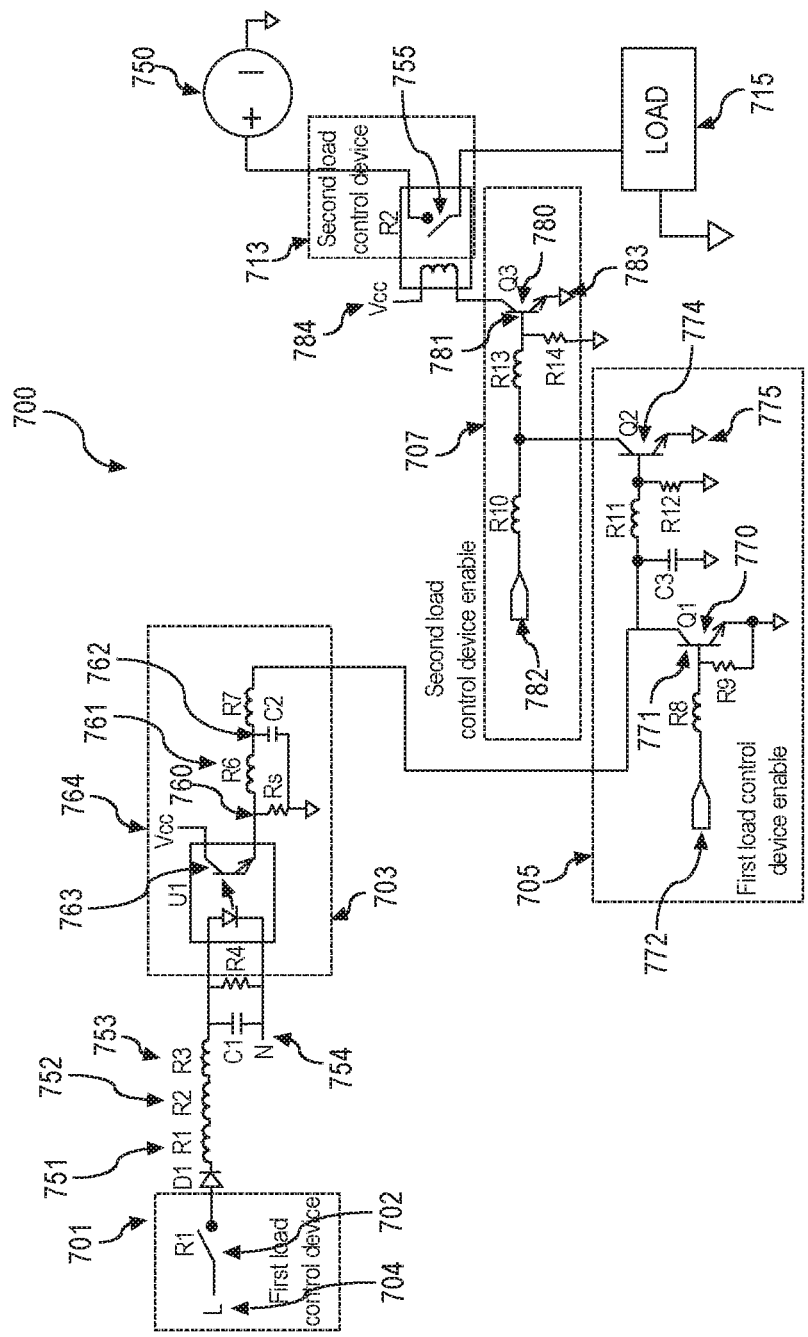
FIG. 7 depicts a schematic diagram of a relay monitor circuit and secondary relay control according to example embodiments of the present disclosure.

FIG. 7 depicts a schematic diagram of a relay monitor circuit and secondary relay control system 700 according to example embodiments of the present disclosure.

Relay monitor circuit and secondary relay control system 700 may be used to control certain operations of a load, such as a heating element of an appliance (e.g., heating element 170 of dishwasher 100). Relay monitor circuit and secondary relay control system 700 can be incorporated with one or more controllers, such as controller 137, or with other electronic components, PCBs or circuit elements included with an appliance, such as dishwasher 100. Alternatively, relay monitor circuit and secondary relay control system 700 may be configured as a separate and modular unit that can be removably attached to dishwasher 100 and/or in electrical communication with controller 137, such that relay monitor circuit and secondary relay control system 700 may be disconnected and/or removed from dishwasher 100 and replaced by the user or consumer. Relay monitor circuit and secondary relay control system 700 can be utilized to control the delivery of power to any load in an appliance, such as heating element 170 (depicted in FIG. 4), on the line and neutral side of the load.

Relay monitor circuit and secondary relay control system 700 includes a first load control device 701 and a second load control device 713 to control the delivery of power to load 715. Controller 137 (depicted in FIGS. 2 and 4) may be utilized to selectively operate second load control device 713 such that power is or is not delivered to load 715, based upon the operational state of first load control device 701, the first load control device enable circuit 705 and second load control device enable circuit 707. As detailed herein, relay monitor circuit and secondary relay control system 700 can control the secondary load control device 713 (e.g., operating second load control device 713 such that it selectively electrically couples power supply 750 to a load 715 via switching element 755, thereby providing power to load 715), based upon the first load control device 701 status (e.g., whether or not power supply 704 is electrically coupled to resistor 751 via switching element 702), based upon the status of first load control device enable circuit 705 and based upon the second load control device enable circuit 707. Relay monitor circuit and secondary relay control system 700 allows for a second load control device 713, to be selectively controlled if it is determined that first load control device 701, has failed or is otherwise operating improperly (e.g., is not in the operational state correspondence to a user input or the operational state of first load control device 701 is different from the operational state corresponding to an operational signal or command from controller 137).

For example, if first load control device 701 is in an ON state (e.g., switching element 702 is closed or in a state electrically coupling power supply 704 to resistor 751) but first load control device enable circuit 705 is in a disabled or OFF state (e.g., first load control device enable circuit 705 is not in an operational state based upon a user input or a signal or command from controller 137 for the appliance 100 or load 715 to not operate), second load control device enable circuit 707 will generate a control signal which operates second load control device 713 such that switch 754 is open or disabled (e.g., operating second load control device 713 such that it selectively electrically disconnects power supply 750 from load 715, thereby preventing electrical power from reaching load 715). In this way, relay monitor circuit and secondary relay control system 700 can be utilized to prevent a single point failure within associated with the power system of appliance 100. A single point failure occurs in an appliance 100 which contains only a single load control device, such as first load control device 701, and which fails or operates improperly, which can result in continued operation of a load, such as heating element 170 in appliance 100, resulting in an undesirable condition such as thermal runaway.

Relay monitor circuit and secondary relay control system 700 includes a first load control device 701 and second load control device 713. First load control device 701 and second load control device 713 can each be a relay, triac or other suitable switching element. In certain embodiments, first load control device 701 could be any suitable controllable switching element that can selectively couple a power supply 704 to an electrical path or element, such as resistor 751, or otherwise facilitate a selectable electrical connection in an appliance.

Relay monitor circuit and secondary relay control system 700 includes a first resistor 751, second resistor 752 and third resistor 753 that are electrically connected in series with first load control device 701 and a first load control device status detector 703. The value or resistance of the first resistor 751, second resistor 752 and third resistor 753 is based on the power required by the load 715 or power requirement on the neutral side 754 of relay monitor circuit and secondary relay control system 700.

Advantages of relay monitor circuit and secondary relay control 700 include that relay monitor circuit and secondary relay control system 700 is configured such that power to load 715 may be interrupted on the neutral side and line side of the load 715. For example, first load control device 701 can interrupt power delivery to or operation of an appliance 100 on the neutral side by interrupting power to neutral line 754 when switching element 702 is open or otherwise not operating to electrically connect power supply 704 to resistor 751 via switching element 702.

Relay monitor circuit and secondary relay control system 700 includes a first load control device status detector 703. First load control device status detector 703 can be a status sensor for determining whether the first load control device 701 is in an "ON" state (e.g., the switching element 702 is such that a circuit is closed) or is in an "OFF" state (e.g., the switching element 702 is such that a circuit is open). First load control device status detector 703 includes one or more resistors (760 and 761) and a capacitor 763 configured to account for delays or transition times associated with the operation of switching element 702. For example, if switching element 702 is a relay, a delay or transition time of up to 8 milliseconds can be required to operate switching element 702 between an open or closed state. Accordingly, one or more resistors (760 and 761) and capacitor 762 are selected and sized such that a signal is provided from capacitor 762 to the first load control device enable circuit 705 during the time period associated with the delay occasioned by the operation of switching element 702. Switching element 702 can also be a triac, the operation of which is dependent upon each zero-cross event associated with an AC voltage signal. Accordingly, one or more resistors (760 and 761) and a capacitor 762 are selected and sized such that a signal is provided from capacitor 762 to the first load control device enable circuit 705 for the time period for zero-cross events associated with the operation of triac switching element 702.

First load control device status detector 703 can generate a signal indicative whether first load control device 701 is in an ON state or OFF state. When first load control device status detector 703 determines first load control device 701 is in an ON state, first load control device status detector 703 operates switching element 763 (which can be any suitable switching element, such as an IGBT) such that a signal, in the form of voltage from node 764, is provided to first load control device enable circuit 705. Voltage at node 764 can be provided by any suitable power source within appliance 100.

First load control device enable circuit 705 can include switching element 770 (which can be any suitable switching element, such as an IGBT) such that the signal from node 764, is provided to switching element 770. Switching element 770 of first load control device enable circuit 705 is controlled by a control signal provided at gate 771. The control signal provided at gate 771 based upon a user input or a signal or command from controller 137 for the appliance 100 received by first load control device enable circuit 705 at node 772. If the control signal provided at node 772 is indicative of a user input for the appliance 100 or load 715 not to operate, switching element 770 is operated such that the signal from node 764 is sent to ground 773. If the signal or command from controller 137 at node 772 is indicative of a user input for the appliance 100 or load 715 to operate, switching element 770 is operated such that the signal from node 764 is sent to switching element 774.

First load control device enable circuit 705 can include second switching element 774 (which can be any suitable switching element, such as an IGBT) such that the signal from node 764, is provided to switching element 774. Switching element 774 of first load control device enable circuit 705 is controlled by a signal provided at gate 776. The control signal provided at gate 776 based upon a user input or a signal or command from controller 137 for the appliance 100 received by first load control device enable circuit 705 at node 772 and signal from node 764. If the signal or command from controller 137 at node 772 is indicative of a user input for the appliance 100 or load 715 to operate, switching element 770 is operated such that the signal from node 764 is sent to ground 773. If the signal or command from controller 137 at node 772 is indicative of a user input for the appliance 100 or load 715 not to operate, switching element 770 is operated such that the signal from node 764 is sent to switching element 774. In this way, switching element 774 will operate to such that the signal or command from controller 137 received at node 782 of second load control device 707 is sent to ground 775, rather than being provided to gate 781 to operate switching element 780 as described below.

Second load control device enable circuit 707 includes switching element 780 (which can be any suitable switching element, such as an IGBT) such that the signal from node 782, is provided to switching element 780. Switching element 780 of second load control device enable circuit 707 is controlled by a signal provided at gate 781. The control signal provided at gate 781 based upon a user input or a signal or command from controller 137 for the appliance 100 received by second load control device enable circuit 707 at node 782. If the signal or command from controller 137 at node 782 is indicative of a user input for the appliance 100 or load 715 to operate, switching element 780 is operated such that the voltage signal from node 784 is sent to ground 783, which in-turn operates second load control device 713 such that power is provided to load 715 (e.g., closes switching element 755). If the signal or command from controller 137 at node 782 is indicative of a user input for the appliance 100 or load 715 not to operate, switching element 780 is operated such that the signal from node 784 does not flow through switching element 780 and second load control device 713 operates such that power is not provided to load 715 (e.g., switching element 755 is open).

Although specific features of various embodiments may be shown in some drawings and not in others, this is for convenience only. In accordance with the principles of the present disclosure, any feature of a drawing can be referenced and/or claimed in combination with any feature of any other drawing.

This written description uses examples for the disclosure, including the best mode, and also to enable any person skilled in the art to practice the disclosure, including making and using any devices or systems and performing any incorporated methods. The patentable scope of the disclosure is defined by the claims, and can include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A control system for operating a load of an appliance, the control system comprising, one or more processors and one or more memory devices, the one or more memory devices configured to store instructions that when executed by the one or more processors cause the one or more processors to perform operations, the operations comprising:
   determining an operational state of a first load control device using a first load control status detector comprising one or more resistors and a capacitor, wherein the first load control device comprises a triac switching element that electrically couples a power supply to the load of the appliance, and wherein determining the operational state of the first load control device is based at least in part on a time period associated with the operation of the first load control device at a zero-cross event;
   generating a first control signal based on the operational state of the first load control device;
   determining the operational state of a first load control device enable circuit;
   generating a second control signal based on the operational state of the first load control device enable circuit;
   generating a first load control signal based, at least in part, on the first control signal and second control signal; and
   operating a second load control device based, at least in part, on the first load control signal, wherein the second load control device electrically couples the power supply to the load of the appliance.

2. The control system of claim 1, wherein the operations further comprise:
   determining the operational status of a second load control device enable circuit;
   generating a second load control signal based on the operational status of the second load control device enable circuit; and
   operating the second load control device based, at least in part, on the second load control signal.

3. The control system of claim 2, wherein the operations further comprise:
   generating a third load control signal based, at least in part, on the first load control signal and the second load control signal; and
   operating the second load control device based, at least in part, on the third load control signal.

4. The control system of claim 3, wherein the status of the first load control device enable circuit is based, at least in part, on one or more user inputs.

5. The control system of claim 4, wherein the status of the second load control device enable circuit is based, at least in part, on one or more user inputs.

6. The control system of claim 5, wherein each of the first load control device and the second load control device comprise a switching element.

7. An appliance comprising:
   a first power source;
   a first load, wherein the load is a heating element;

a first load control device, wherein the first load control device comprises a triac switching element that electrically couples the first power source to the first load;
a second load control device, wherein the second load control device electrically couples the first power source to the first load;
a first load control device enable circuit;
a first load control status detector comprising one or more resistors and a capacitor; and
one or more control devices wherein the one or more control devices configured to perform operations, the operations comprising:
  determining an operational state of the first load control device using the first load control status detector, wherein determining the operational state of the first load control device is based at least in part on a time period associated with the operation of the first load control device at a zero-cross event;
  generating a first control signal based on the operational state of the first load control device;
  determining the operational state of the first load control device enable circuit;
  generating a second control signal based on the operational state of the first load control device enable circuit;
  generating a first load control signal based, at least in part, on the first control signal and second control signal; and
  operating the second load control device based, at least in part, on the first load control signal.

8. The appliance of claim 7, further comprising a second load control device enable circuit and wherein the operations performed by the one or more control devices further comprise:
  determining the operational status of the second load control device enable circuit;
  generating a second load control signal based on the operational status of the second load control device enable circuit; and
  operating the second load control device based, at least in part, on the second load control signal.

9. The appliance of claim 8, wherein the operations performed by the one or more control devices further comprise:
  generating a third load control signal based, at least in part, on the first load control signal and the second load control signal; and
  operating the second load control device based, at least in part, on the third load control signal.

10. The appliance of claim 9, wherein the status of the first load control device enable circuit is based, at least in part, on one or more user inputs.

11. The appliance of claim 10, wherein the status of the second load control device enable circuit is based, at least in part, on one or more user inputs.

12. The appliance of claim 11, wherein the second load control device comprises a switching element.

13. The appliance of claim 12, wherein the first load control device status detector detects a current or a voltage provided from a second power source to a second load through the first load control device.

14. A method for controlling an appliance, wherein the appliance comprises a relay monitor circuit and secondary relay control, including a first load control device, a first load control device enable circuit, a second load control device, a second load control device enable circuit and a load, the method comprising:
  determining, by one or more controllers, whether the first load control device is in an operational state, based at least in part on a first load control status detector comprising one or more resistors and a capacitor, wherein the first electrical load control device comprises a triac switching element that electrically couples an electrical power supply to the load and wherein determining the operational state of the first load control device is based at least in part on a time period associated with the operation of the first load control device at a zero-cross event;
  generating, by one or more controllers, a first control signal based on the operational state of the first load control device;
  determining, by one or more controllers, the operational state of a first load control device enable circuit;
  generating, by one or more controllers, a second control signal based on the operational state of the first load control device enable circuit;
  generating, by one or more controllers, a first load control signal based, at least in part, on the first control signal and second control signal; and
  operating, by one or more controllers, a second load control device based, at least in part, on the first load control signal.

15. The method of claim 14 further comprising:
determining the operational status of a second load control device enable circuit;
  generating a second load control signal based on the operational status of the second load control device enable circuit; and
  operating the second load control device based, at least in part, on the second load control signal.

16. The method of claim 15, further comprising:
  generating a third load control signal based, at least in part, on the first load control signal and the second load control signal; and
  operating the second load control device based, at least in part, on the third load control signal.

17. The method of claim 16, wherein the status of the first load control device enable circuit is based, at least in part, on one or more user inputs.

18. The method of claim 17, wherein the status of the second load control device enable circuit is based, at least in part, on one or more user inputs.

* * * * *